(12) United States Patent
Giannuzzi

(10) Patent No.: US 11,808,679 B2
(45) Date of Patent: Nov. 7, 2023

(54) METHOD AND APPARATUS FOR CRYOGENIC AND ENVIRONMENTAL CONTROLLED SPECIMEN HANDLING

(71) Applicant: EXpressLO LLC, Lehigh Acres, FL (US)

(72) Inventor: Lucille A. Giannuzzi, Fort Myers, FL (US)

(73) Assignee: EXpressLO LLC, Lehigh Acres, FL (US)

( * ) Notice: Subject to any disclaimer, the term of this patent is extended or adjusted under 35 U.S.C. 154(b) by 135 days.

(21) Appl. No.: 17/586,565

(22) Filed: Jan. 27, 2022

(65) Prior Publication Data

US 2023/0236095 A1    Jul. 27, 2023

(51) Int. Cl.
*G01N 1/42* (2006.01)
(52) U.S. Cl.
CPC ..................... *G01N 1/42* (2013.01)
(58) Field of Classification Search
CPC ....................................................... G01N 1/42
See application file for complete search history.

(56) References Cited

U.S. PATENT DOCUMENTS

| | | |
|---|---|---|
| 2,416,782 A | 3/1947 | Valish |
| 3,296,821 A | 1/1967 | Malinin |
| 3,680,420 A | 8/1972 | Blum |
| 4,307,507 A | 12/1981 | Gray et al. |
| 4,445,678 A | 5/1984 | George |
| 4,685,996 A | 8/1987 | Busta et al. |
| 4,723,420 A * | 2/1988 | Sitte .................. F25D 3/10 62/51.1 |
| 4,861,011 A | 8/1989 | Varga |
| 4,916,002 A | 4/1990 | Carver |
| 4,939,364 A | 7/1990 | Ishitani et al. |
| 5,050,470 A | 9/1991 | Ward |
| D330,315 S | 10/1992 | Shved |
| 5,399,232 A | 3/1995 | Albrecht et al. |
| 5,461,907 A | 10/1995 | Tench et al. |

(Continued)

FOREIGN PATENT DOCUMENTS

| | | | |
|---|---|---|---|
| DE | 4028806 A1 | 8/1998 | |
| DE | 102005003284 A1 * | 7/2006 | ........... A01N 1/0257 |
| KR | 2016071527 | 6/2016 | |

OTHER PUBLICATIONS

Giannuzzi et al., "Theory and New Applications of Ex Situ Lift Out," Microsc. Microanal. 21, 1034-1048, 2015.

(Continued)

*Primary Examiner* — Francis C Gray
(74) *Attorney, Agent, or Firm* — Schaffer IP Law, LLC

(57) ABSTRACT

A method for manipulating a cryogenic specimen for subsequent examination includes mounting a cryogenic specimen on a work surface of a specimen holder and placing the specimen holder within a pumped cryostat chamber having a layer of cryogenic liquid therein. The cryostat chamber is vented and kept at low humidity in order to generate a cryogenic vapor layer above the cryogenic liquid so that the work surface of the specimen holder is within the cryogenic vapor layer and low humidity and inert environment. The cryogenic specimen in then manipulated to a specimen carrier contained on a different portion of the work surface while keeping the cryogenic specimen within the cryogenic vapor layer.

22 Claims, 12 Drawing Sheets

(56) References Cited

U.S. PATENT DOCUMENTS

| | | |
|---|---|---|
| 5,476,131 A | 12/1995 | Hamilton et al. |
| 5,546,375 A | 8/1996 | Shimada et al. |
| 6,065,744 A | 5/2000 | Lawrence |
| 6,188,068 B1 | 2/2001 | Shaapur et al. |
| 6,237,907 B1 | 5/2001 | Lawrence |
| 6,262,514 B1 | 7/2001 | Bansevicius et al. |
| 6,420,722 B2 | 7/2002 | Moore et al. |
| 6,576,900 B2 | 6/2003 | Kelly et al. |
| 6,869,347 B2 | 3/2005 | Koinkar et al. |
| 7,041,985 B1 | 5/2006 | Wang et al. |
| 7,845,245 B2 | 12/2010 | Hayles et al. |
| 8,357,913 B2 | 1/2013 | Agorio et al. |
| 8,455,821 B2 | 6/2013 | Arjavac et al. |
| 8,604,446 B2 | 12/2013 | Ditto |
| 8,740,209 B2 | 6/2014 | Giannuzzi |
| 8,789,826 B2 | 7/2014 | Giannuzzi |
| 8,890,064 B2 | 11/2014 | Arjavac et al. |
| 8,921,785 B2 | 12/2014 | Schampers et al. |
| 9,142,384 B2 | 9/2015 | Schampers et al. |
| 9,512,460 B2 | 12/2016 | Mayer et al. |
| 10,522,324 B1 | 12/2019 | Giannuzzi |
| 10,801,926 B2 | 10/2020 | Giannuzzi |
| 2006/0073079 A1* | 4/2006 | Goll ............... B01L 7/50 422/400 |
| 2006/0162653 A1* | 7/2006 | Lihl ............... G01N 1/42 62/51.1 |
| 2010/0032581 A1 | 2/2010 | Grosse et al. |
| 2012/0220046 A1* | 8/2012 | Chao ............... H01J 37/317 422/186.04 |
| 2012/0286175 A1 | 11/2012 | Searle et al. |
| 2016/0143270 A1* | 5/2016 | Schryver ............... A01N 1/0257 220/560.04 |
| 2020/0141846 A1* | 5/2020 | Zandbergen ............ H01J 37/20 |

OTHER PUBLICATIONS

A. Giannuzzi J .L. Drown, SR. Brown, R.B. Irwin, FA. Stevie, "Focused Ion Beam Milling and Micromanipulation Lift-Out for Site Specific Cross-Section TEM Specimen Preparation," Mat. Res. Soc. Symp. Proc. vol. 480, Workshop on Specimen Preparation for TEM of Materials IV, (1997), Materials Research Society, p. 19-27.

Patterson, R. J., Mayer, D., Weaver, L. and Phaneuf, M. W., "H-Bar Lift-Out" and "Plan-View Lift-Out": Robust, Re-thinnable FIB TEM Preparation for EX-Situ Cross-Sectional and Plan-View FIB Specimen Preparation, Microscopy and Microanalysis, Aug. 2002, vol. 8, pp. 566-567.

L.A. Giannuzzi "Optimizing ex situ Lift Out for Frontside or Backside FIB Milling," ISTFA 2017: Proceedings from the 43rd International Symposium for Testing and Failure Analysis, 275-278, 2017.

Giannuzzi et al., "Vacuum Assisted ex situ Lift Out for Manipulation of FIB Prepared Specimens," ISTFA 2015: Proceedings from the 41st International Symposium for Testing and Failure Analysis, 56-59, 2015.

Punyatanasakchai et al., "Comparison of cryopreserved human sperm in vapor and liquid phases of liquid nitrogen: effect on motility parameters, morphology, and sperm function," Fertility and Sterility, vol. 90, No. 5, 1978-1982, 2008.

"EX-Situ Lift-Out," video, http://wwwkleindiek.com/exsitu-liftout.html, retrieved Mar. 6, 2012.

* cited by examiner

METHOD AND APPARATUS FOR CRYOGENIC AND ENVIRONMENTAL CONTROLLED SPECIMEN HANDLING

BACKGROUND OF THE INVENTION

1. Field of the Invention

This invention relates generally to the manipulation of focused ion beam prepared specimens, and more specifically to detailed methods and systems for manipulating specimens at cryogenic temperatures where necessary for examination using cryogenic electron microscopy, or spectroscopic or analytical examination via a broad array of methods.

2. Description of the Prior Art

The manipulation of small specimens from a larger bulk sample for examination using such tools as an electron microscope is extremely complicated and has resulted in development of several sophisticated processes. Unfortunately, there does not exist an effective in situ (manipulation and examination within the instrument that created the specimen) or ex situ (manipulation and examination outside of the instrument that created the specimen) method to date that adequately manipulates specimens under cryogenic and environmentally controlled conditions where such temperature control conditions are required. Such cryogenic conditions may be required where, for instance, vitreous biological specimens or other beam sensitive materials (e.g., polymer, organics, Li-based, Na-based, etc.) are used. Such materials must stay cold or be maintained at cryogenic temperatures, or must remain in a controlled environment during FIB milling and manipulation, for subsequent cryo-EM (or ambient EM) or other characterization techniques and analysis.

Cryogenic specimen preparation performed at temperatures <−140° C. is necessary to retain the vitreous phase of biological tissue to prevent ice crystal formation, which can obscure electron microscopy imaging contrast and damage cells. Prior methods of manipulation of cryogenically prepared focused ion beam (cryo-FIB) specimens for subsequent cryogenic electron microscopy examination (cryo-EM) are performed under vacuum inside the particle optics instrument vacuum chamber (i.e., the FIB) using a cryogenic sample stage holder and separate cryogenically cooled probe and are referred to as cryogenic in situ lift out (cryo-INLO). These cryo-INLO prior methods include: (i) attaching a cryo-probe tip to the specimen and then securing it to a carrier grid using different deposition methods, and/or (ii) vibration of the cryo-probe tip against the specimen to create a localized phase change of matter which leads to attachment of the tip to the specimen and securing it to a carrier grid, and/or (iii) a cryo-gripper-type probe to grasp the specimen and secure it to a carrier grid. In some cases, cryo-FIB milling may be required to mill the specimen to remove it from its trench walls after the probe is attached, and/or to mill the cryo-probe tip away to remove it from the specimen after attaching it (by deposition or phase change) to the specimen grid carrier so that the specimen can be further cryo-FIB milled and thinned for cryo-EM.

Cryo-FIB INLO requires the use of a probe tip (usually metal) configured as part of a cryostat independent of the cryo-sample holder such that the tip can be maintained at cryogenic temperatures to maintain the specimen in the vitreous phase during specimen extraction (i.e., "lift out") from the bulk sample while it also is maintained at cryogenic temperatures while being mounted onto a cryo-stage in the FIB.

There are numerous complex steps necessary for cryo-FIB INLO that typically require 30-60 minutes to complete. Since the specimen and probe tip are cooled independently, it can be difficult to maintain the cryo-specimen and the cryo-probe tip at exactly the same cryogenic temperature during these steps, which can often result in thermal drift between the two when they are in contact. This thermal drift frequently results in an inability to form a secure attachment, resulting in breakage and failure at the deposition point, particularly since this temperature stability must be maintained for several minutes during the deposition/attachment process. Since cryo-INLO methods require cryo-manipulation of FIB-prepared specimens inside the FIB vacuum chamber with numerous complex steps, this leads to the risk of specimen destruction/loss resulting in poor success rates of typically only 1 useable specimen per day, ultimately significantly increasing the cost per specimen.

An alternative to the cryo-FIB INLO method, cryogenic ultramicrotomy, uses a knife to slice frozen thin specimens for cryo-EM. The knife causes mechanical damage, and the method is not ideal for site-specific sectioning. Probes employed for cryogenic ultramicrotomy are primarily only used to guide large specimen slices (~0.5 mm or larger) to a carbon-coated grid carrier surface and thus consist of a totally different geometry and size as compared to FIB-prepared specimens (~20 micrometers in length). Furthermore, these probes cannot be used to specifically "pluck," "pick," or "lift out" specimens at a particular site from a bulk cryogenically contained specimen confined within a FIB milled trench, and then to subsequently transfer/manipulate the thinned specimen to a site-specific region of the carrier grid. Thus, cryogenic ultramicrotomy applications and methods are not applicable to cryogenic manipulation of FIB-prepared lamella or other small specimens.

Ex situ lift-out (EXLO) is a well-known ambient (room temperature and conditions) probing technique that is typically used to manipulate specimens for subsequent transmission electron microscopy (EM) or other analytical characterization after site-specific focused ion beam (FIB) milling routines are performed. In addition to EM, FIB prepared lift outs have been analyzed by a number of techniques, including but not limited to: scanning electron microscopy, confocal microscopy, Auger microscopy, scanning probe microscopy, secondary ion mass spectrometry, Raman spectroscopy, synchrotron, X-ray analysis, and other similar spectroscopic techniques.

With EXLO, specimens are FIB milled inside of a charged particle vacuum environment and then the specimen is manipulated to a thin-film-coated (e.g., carbon, holey carbon, formvar, etc.) or slotted EM grid guided with a light optical microscope and micromanipulator system on a motorized sample stage in ambient temperature conditions outside of the FIB. The advantages of the EXLO method for FIB specimens are: (i) it is site-specific, (ii) it has a high success rate, (iii) it is fast and easy and therefore more cost effective, and (iv) specimens can be further FIB thinned if necessary. Currently, the primary disadvantage of EXLO is that the technique has been limited only to manipulation in air at room temperature (e.g., ambient) conditions. EXLO manipulation of FIB specimens may be performed predominantly with Van der Waals forces to adhere the probe tip to the specimen, or via vacuum assisted manipulation, or via a gripper type probe.

While INLO techniques exist that are capable of manipulating specimens in a cryo environment, they have several disadvantages and complications that result in slow throughput and increased chance of specimen destruction. And while EXLO techniques exist that have several advantages over existing INLO techniques, the technique has been limited only to manipulation in air at room temperature (e.g., ambient) conditions and has thus not yet been properly adapted for the manipulation of specimens at cryogenic temperatures.

Accordingly, it is desired to provide a more effective method to manipulate small cryogenic specimens that avoids the drawbacks of the prior art.

SUMMARY OF THE INVENTION

A method for manipulating a cryogenic specimen for subsequent examination comprises the steps of first mounting a cryogenic specimen on a work surface of a specimen holder. The specimen holder is then placed within a cryostat chamber having a layer of cryogenic liquid therein, with a cryogenic vapor layer above the cryogenic liquid so that the work surface of the specimen holder is within the cryogenic vapor layer. The cryogenic specimen is then manipulated to a specimen carrier contained on a different portion of the work surface while keeping the cryogenic specimen within the cryogenic vapor layer.

An apparatus for manipulating a cryogenic specimen includes a cryostat chamber having a layer of cryogenic liquid and cryogenic vapor layer above the cryogenic liquid. A cryogenic specimen holder is positioned within the cryostat chamber and configured to maintain a cryogenic specimen on a work surface located only within the cryogenic vapor layer. The apparatus can further include a transition chamber maintained under vacuum and having a layer of cryogenic liquid therein, and a cryo-jacket positioned within the cryogenic liquid of the transition chamber. The cryo jacket is configured to have its bottom and side walls in contact with, but elevated above, a top surface of the cryogenic liquid so as to form an interior compartment configured to receive the cryogenic specimen holder within such that the cryo-holder makes no contact with the cryogenic liquid.

The current invention exploits fast, easy, and reproducible EXLO methods applied to cryogenic and environmentally prepared FIB specimens. This is novel because EXLO has previously only been performed at ambient conditions. This invention applies to the manipulation of FIB milled or other small specimens (e.g., fibers, particles, or laser cut specimens) outside of the instrument that created such specimens. The current invention may utilize a number of different probe designs, consisting of but not limited to; a glass or metal probe pulled to a fine needle tip, a metalized glass probe, a hollow glass or metal probe whose opening geometry matches the geometry of the specimen to be manipulated, a gripper or end effector probe, a probe that uses some other attachment mechanics such as glue. The methods and apparatus are designed to keep the specimen vitreous during all transfer and manipulation steps and performed in a highly time efficient manner. In addition, the cryo-FIB prepared specimen may be completely FIB milled free, or tiny tabs of material may remain on either side of the specimen. The manipulation is performed on a work surface in a cryogenic vapor phase such that the FIB specimen, the specimen carrier, and the probe are all at the same cryogenic temperature as described below.

BRIEF DESCRIPTION OF THE DRAWINGS

The foregoing and other objects, features and advantages of the invention will become more readily apparent from the following detailed description of a preferred embodiment of the invention that proceeds with reference to the accompanying drawings, in which.

DETAILED DESCRIPTION

Below we describe a novel method for EXLO manipulation of specimens performed under cryogenic and environmentally controlled conditions. These cryo-EXLO methods can be used for the manipulation of vitreous biological and/or frozen specimens and for any environmental or beam sensitive material (e.g., polymer, organics, Li-based, Na-based, etc.) that must stay cold or be maintained at cryogenic temperatures or remain in a controlled environment during FIB milling and manipulation for subsequent cryo-EM (or ambient EM), or other characterization techniques and analysis. The vitreous specimen may be initially cryogenically prepared by cooling the specimen very quickly (e.g., plunge-freezing), or by high pressure freezing.

While the invention is directed to the novel EXLO manipulation of specimens under cryogenic conditions, it is first important to understand how EXLO is currently used in ambient conditions.

Figure 1:
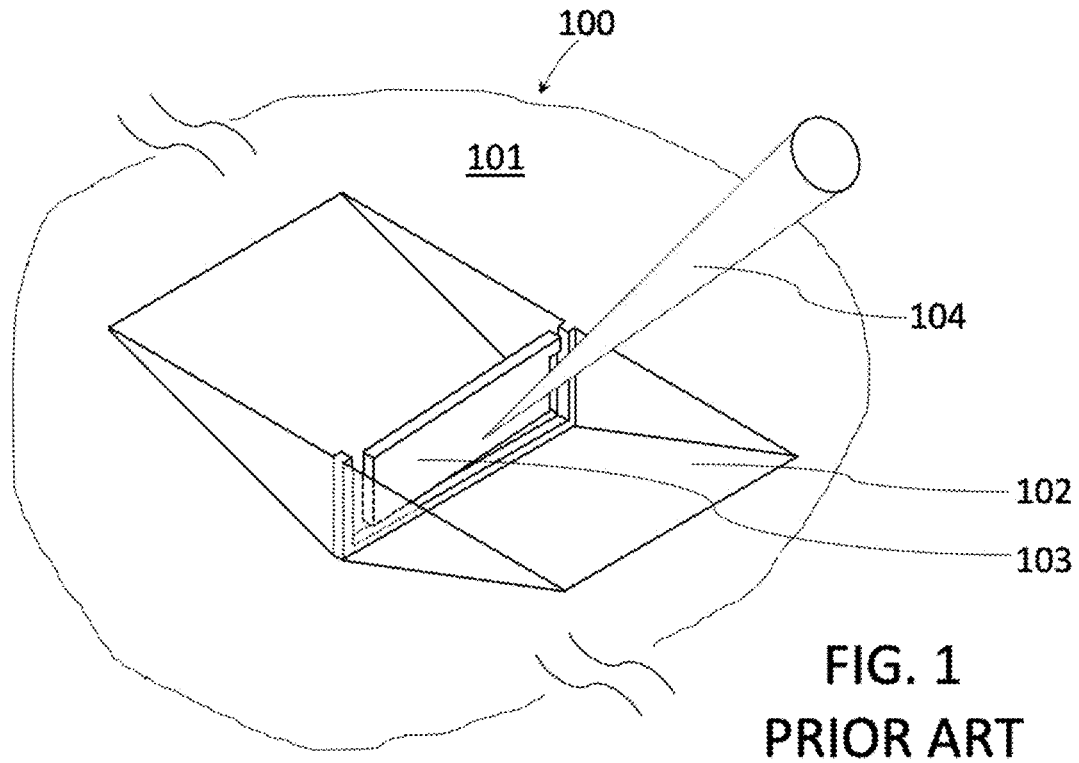
FIG. 1 is a perspective view showing ex situ lift-out (EXLO) using a solid conical glass probe tip as known in the prior art.
Figure 2:
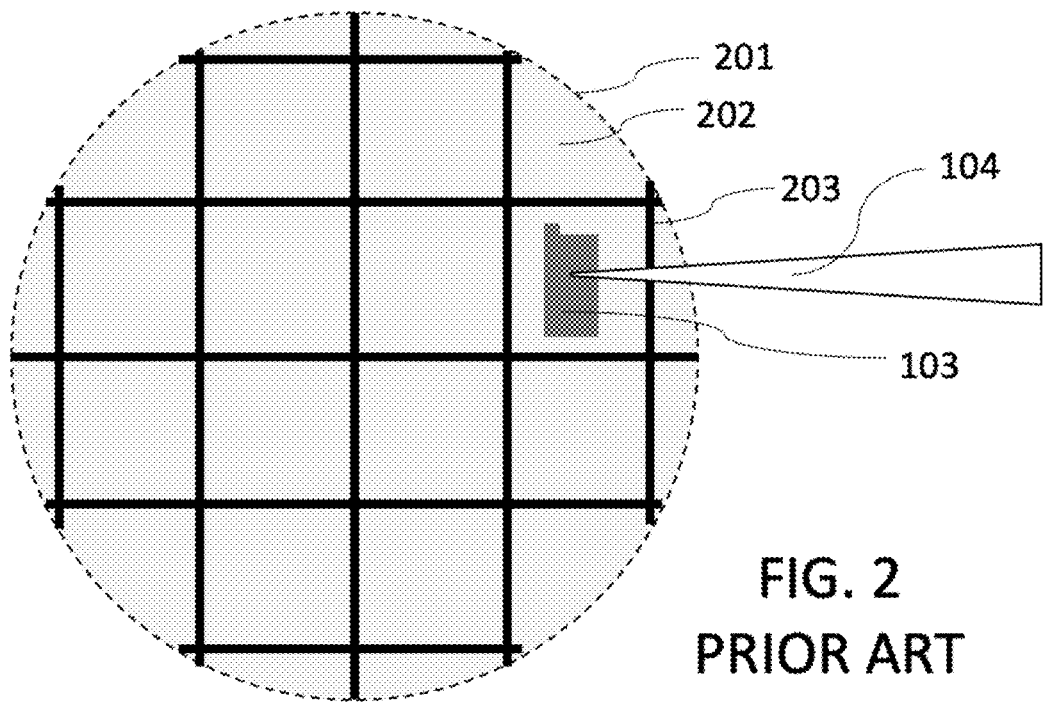
FIG. 2 is a plan view demonstrating EXLO manipulation to a small region of a carbon-coated grid as known in the prior art.

EXLO manipulation in ambient conditions of the specimen to the grid may be performed by different probing methods. One conventional method utilizes Van der Waals attraction as shown in FIG. 1 by touching the outer surface of a glass (or metallized-coated glass) probe 104 to the specimen 103 contained within FIB milled trench walls 102 below the sample surface 101 of a bulk sample 100. As shown in a small portion 201 of an entire 3 mm diameter grid in FIG. 2, the specimen 103 attached to the probe 104 may be transferred or manipulated to a specimen carrier such as a carbon, holey carbon, or formvar coating 202 supported by metallic grid bars 203. Van der Waals adhesion forces are orders of magnitude larger than electrostatic forces or the force of gravity acting on small specimens (Giannuzzi et al., 2015). With EXLO, a conical hollow or solid glass probe tip is heated and pulled to a fine point (e.g., —1 micrometer) and the probe's outer curved surface is used to pick up or lift out a FIB prepared specimen (FIG. 1) and then manipulated to a carbon-coated EM grid carrier, holey carbon-coated EM grid carrier or similar surface (FIG. 2). After the lift out is performed, the probe may be rotated to optimize the position of the specimen for manipulation to the specimen carrier of choice, or a second probe may be used in conjunction with the first to aid in the specimen manipulation process.

Figure 3:
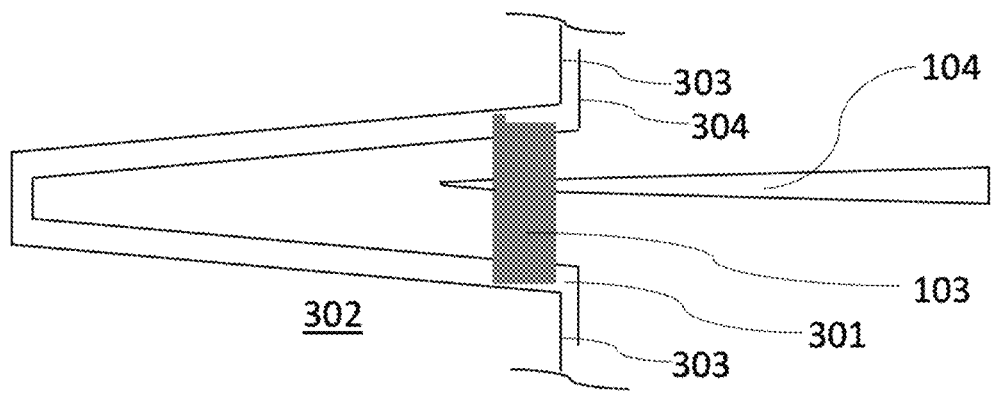
FIG. 3 is a side elevation showing manipulation of an asymmetric FIB prepared specimen into a backside orientation onto a slotted grid surface as known in the prior art.
Figure 4:
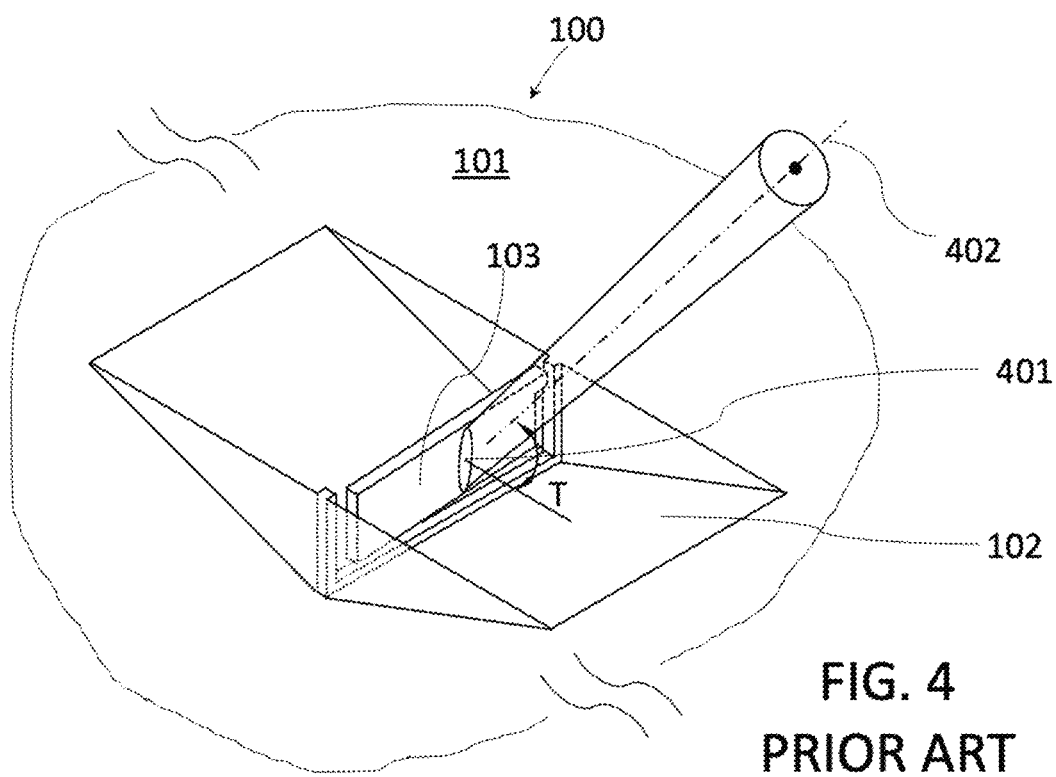
FIG. 4 is a perspective view of a specimen and lift out geometry using a beveled solid probe tip with an elliptical probe flat surface as known in the prior art.

Previous patents by the owner of the present invention (e.g., disclosing EXLO methods described in U.S. Pat. Nos. 8,740,209 and 8,789,826 and 10,801,926—referred to as "EXpressLO methods") describe a specimen carrier and method of EXLO from asymmetric focused ion beam (FIB) prepared specimens with manipulation to slotted specimen grid carriers (FIG. 3 and FIG. 4). The advantages of these EXpressLO methods are: (i) no carbon or thin film support is required to support the specimen, which allows for advanced microscopy without interference from the carbon film, (ii) the specimen may be post-processed after manipulation to the slotted carrier, (iii) backside manipulation for additional FIB milling eliminates FIB curtaining artifacts for the regions of interest, and (iv) beveled surfaces optimize EXLO geometry and increase Van der Waals attraction.

The EXpressLO lift out method shown in FIG. 3 uses a conical glass probe tip 104, as described above, pulled to a fine point (e.g., —1 micrometer) to pick up or lift out a FIB prepared asymmetrically undercut specimen 103 using the probe's outer surface followed by its subsequent manipulation to an EXpressLO open half-grid slotted specimen carrier grid 302. The EXpressLO carrier grid 302 supports the specimen via the surface 301 of recessed slots defined by the upper edge 303 and lower edge 304 of the grid that may be separated by a height of 5 micrometers or more. Prior to manipulation, the probe may be rotated, or the specimen may be nudged or rotated with a second probe or the grid edge 303 to optimize the orientation of specimen 103 on top of the probe 104 prior to manipulating the probe through the slot such that the specimen 103 rests on the grid surface 301. The specimen's surface may be analyzed, or its internal structure may be analyzed by EM by passing the electron beam through the specimen spanning the open slot.

With a focused ion beam (FIB) instrument, the directionality of the specimen is denoted by milling an asymmetric undercut. This specimen asymmetry 103 may be easily visualized with the light optical microscope used for the lift out and micromanipulation process to position a specimen in any desired orientation. During the manipulation process, the probe may be rotated and/or the specimen may be nudged with either a second probe that is held stationary or via a second micromanipulator or using protruding surfaces of the EXpressLO grid to orient the specimen to its desired position prior to manipulating the probe through the EXpressLO grid slot such that the specimen may be manipulated to rest on the EXpressLO grid surface. FIG. 4 shows an example of a beveled elliptical surface 401 relative to the probe axis 402 optimized for Van der Waals lift out. Manipulation to a specimen grid carrier is performed with or without probe rotation.

Figure 5:
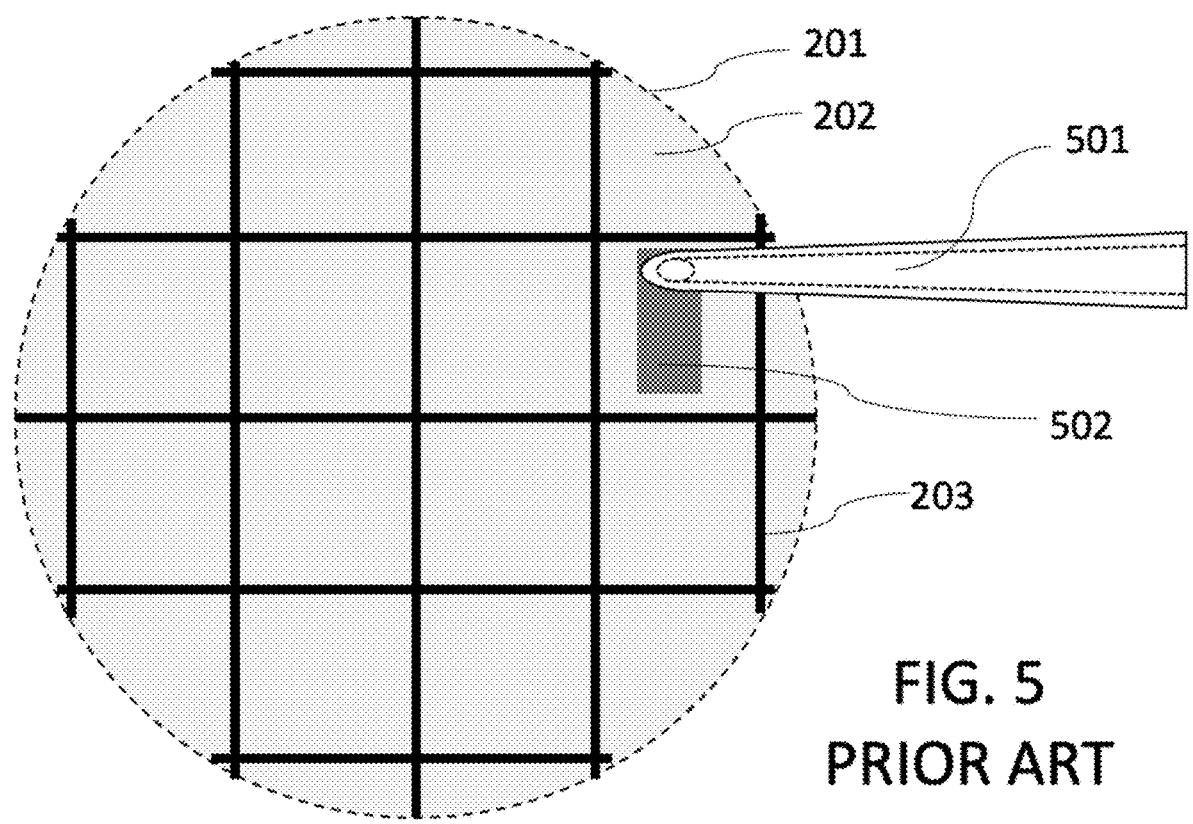
FIG. 5 is a plan view showing manipulation of an FIB prepared specimen to a small portion of a carbon-coated EM grid carrier using vacuum/suction forces through a hollow glass probe tip as known in the prior art.

Other methods for manipulating a specimen in ambient conditions use vacuum suction as a holding force (FIG. 5), or with a variety of grippers or end effectors, or by dipping the probe in glue to adhere the specimen to the probe for transfer to a grid which also contains glue. In one example, a vacuum can be applied through a beveled hollow glass tube 501 to lift out a FIB milled free specimen approached from the top of the specimen (Wang 7,041,985 B1), or to lift out a FIB milled specimen from its face if the specimen is still attached to the bulk FIB milled trench walls (Arjavac 8,455,821 B2, Arjavac 8,890,064 B2). For either of these prior art vacuum methods, the specimen 502 is ultimately manipulated to a carbon-coated 202 EM grid carrier 201 using vacuum or suction forces through a hollow glass probe to assist in the lift out and manipulation process as shown in FIG. 5. Depending on the specific vacuum probing method used, the FIB specimen should be completely FIB milled free, or a tiny bit of material on each outer side of the FIB specimen would remain and would break free during the manipulation process. All these probing methods described in the prior art above describe manipulation under ambient conditions.

Figure 6A:
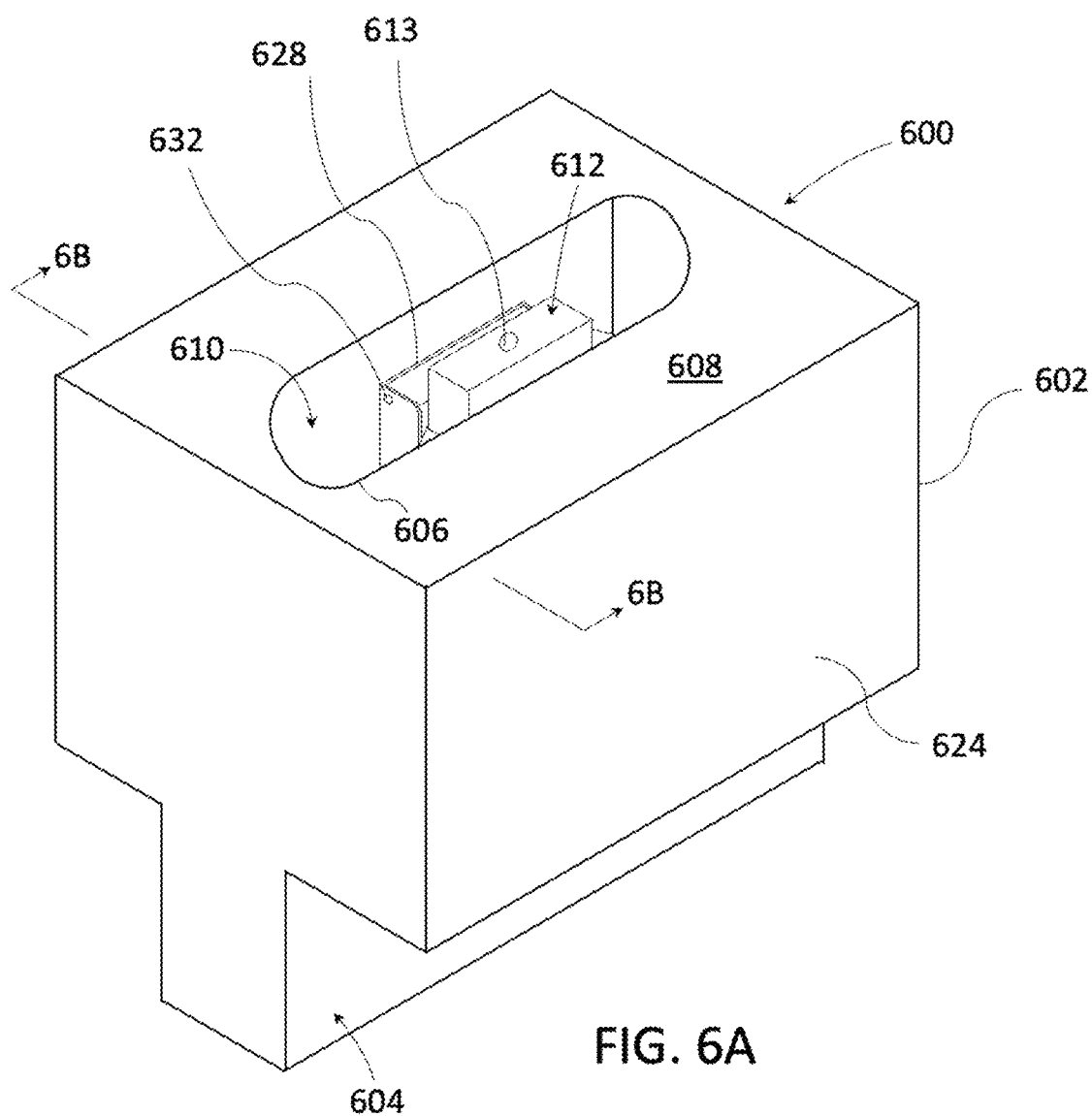
FIGS. 6A and 6B are perspective and side elevation sections, respectively, of a specimen holder retained within a cryo jacket and forming a preferred feature of the present invention.

Turning now to EXLO manipulation methods and apparatuses specific to specimens requiring cryogenic and/or highly controlled environmental conditions, FIG. 6A shows a perspective view of a cryo-jacket 600 that is used to retain, insulate, and protect a specimen, such as specimen 103 (FIG. 1), during a portion of the process described below. Cryo-jacket 600 is preferably formed with a unitary body 602 of a gold-plated copper material. Shaped with a lower dovetail end 604 and having a rectangular upper portion used to facilitate transfer of the cryo-jacket into and out of a cryogenic liquid by using tweezers or forceps. A slot 606 is formed through a top surface 608 of jacket body 602 to serve as entry into an interior compartment 610 of the jacket body. A specimen holder, also referred to as cryo-holder 612, is shown retained within the interior compartment 610 of the cryo-jacket 600 and whose parts will be described further below. An upward-facing side of holder 612 includes an attachment point, such as a bayonet-type receptor or, as shown here threaded hole 613, so that a rod or other transfer device (see FIG. 8) can be used to move the cryo-holder 612 in/out of the FIB 800 (FIG. 8) through FIB airlock 814 to cryo-jacket interior compartment 610.

Figure 6B:
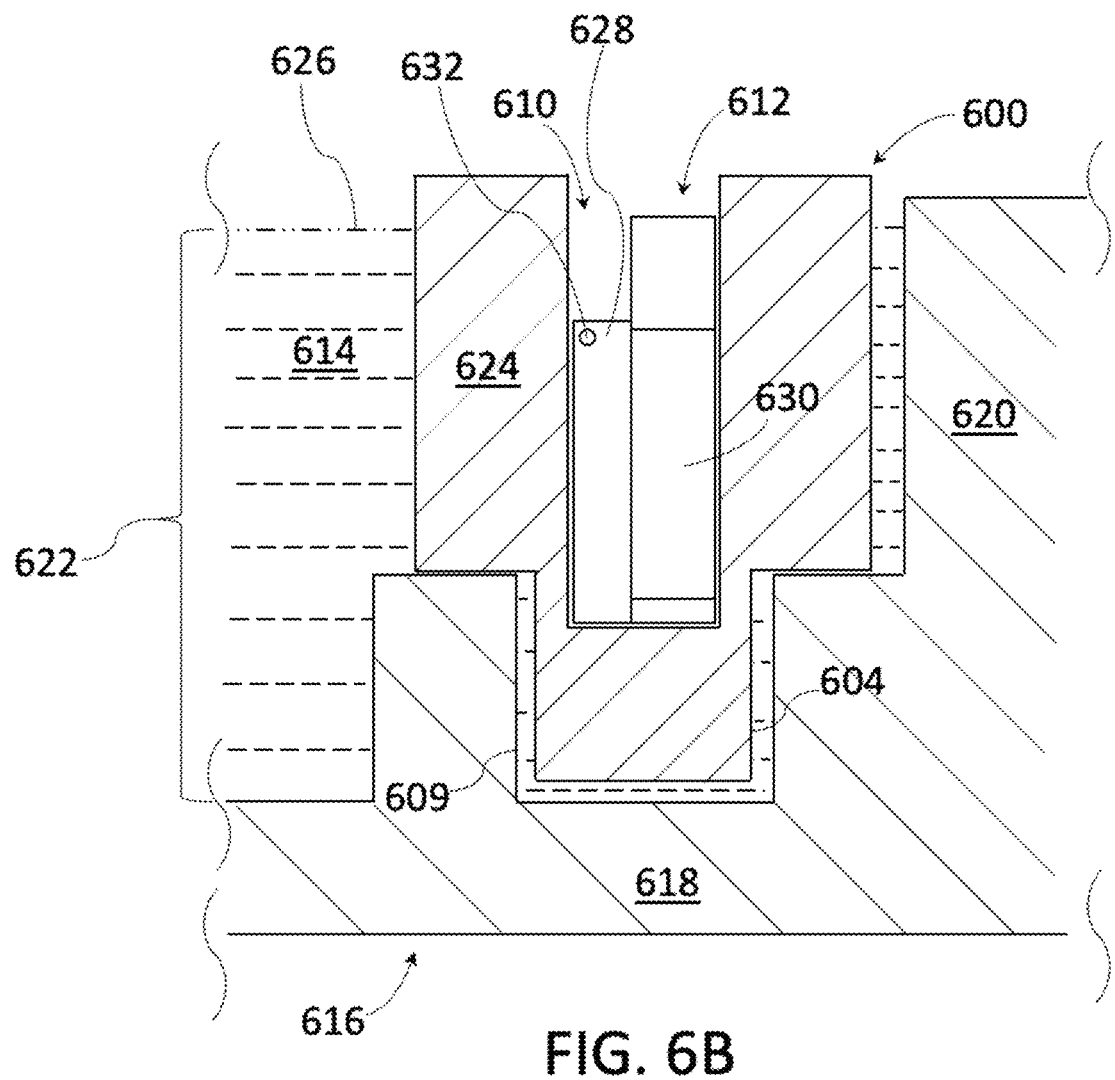

FIG. 6B shows a side elevation view of cryo-jacket 600 taken along section lines 6B-6B in FIG. 6A where the cryo-jacket 600 is partially immersed within a layer of cryogenic fluid 614 retained within a cryostat chamber 616. Cryostat chamber 616 is preferably formed with a base 618 and sidewalls 620 formed to retain the cryogenic fluid 614 within. A slot 609, formed within base 618, is shaped to receive the cryo-jacket dovetail 604 and prevent the cryo-jacket 600 from tilting when the cryo-holder 612 is moved into an out of slot 609. The cryogenic fluid 614 is disposed in the cryostat chamber 616 to a layer thickness 622 sufficient to contact the side and bottom of the cryo-jacket 600. The cryo-jacket sidewalls 624 are of sufficient height, however, to prevent the cryogenic liquid lop layer 626 from extending over the upper height of sidewalls 624 and spilling into the interior compartment 610. The interior compartment 610 and retained cryo-holder 612 are thus kept free of contact with the cryogenic fluid 614, but still kept cool due to its proximity to the cryogenic fluid 614 and the cryo-jacket's outer surfaces 604, 624 in contact with it.

The cryo-holder 612 includes an anti-frost lid 628 pivotally attached to the main body 630 via a screw or pin 632. FIG. 6B shows the cryo-holder lid 628 in a closed position such that it fully covers the work surface 634 (FIG. 7A) while the holder 612 is retained within cryo-jacket 600. The lid 628 protects the work surface 634 from contamination and limits ice crystal growth on the specimen mounted thereon. Cryo-jacket 600 sits inside of the cryostat 616 such that the cryogenic liquid 614 (e.g., liquid nitrogen [LN2], liquid helium, liquid ethane, liquid argon or other similar cryogenic liquid) surrounds and cools the jacket, which subsequently cools the cryo-holder 612.

Figure 7A:
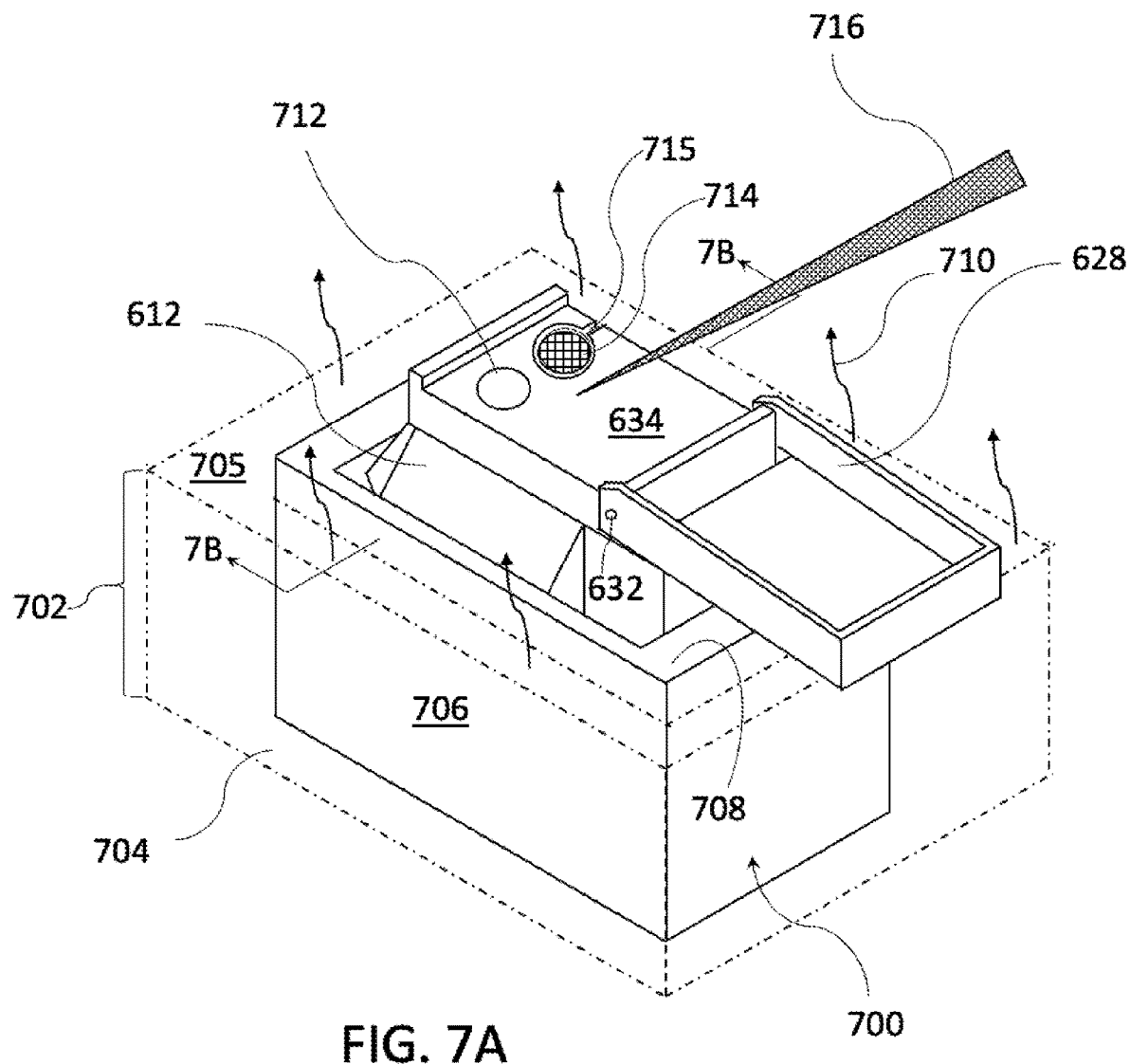
FIGS. 7A and 7B are perspective and side elevation sections, respectively, of a sample holder retained on a moat support structure per teachings of the present invention.

FIG. 7A shows a perspective view of the cryo-holder 612 sitting on top of a moat holder 700. The moat holder 700, in operation, sits within a layer 702 of cryogenic fluid 704—shown here in outline by shadow lines. As will be appreciated below, cryogenic fluid 704 can be the same as that used with the cryo-jacket 600 in FIGS. 6A and 6B so that the cryo-jacket 600 and moat holder 700 can sit in, and be cooled by, the same pool of cryogenic fluid within the cryostat 616. Furthermore, cryogenic layer 702 can be the same as that shown as layer 622 (FIG. 6B). Top surface 705, of layer 702 can, however, have a reduced height as compared to layer 622 due to a boiling off of the cryogenic fluid 614 over time during the maneuvering process, e.g., while the specimen holder 612 is moved to the cryo-jacket 600 and subsequently to the moat holder 700, and while the specimen is being moved from a mounting surface to a grid carrier on the work surface as detailed further below.

Side walls 706 of moat holder 700 extend upward on all sides, preferably but not necessarily above cryogenic layer 702, so as to form a peripheral ridge 708 around the upper surface. The cryo-holder 612 is thus set on this upper surface and surrounded by this peripheral ridge 708 so that the holder 612 is retained in position and prevented from sliding off into the cryogenic fluid 704. The upper surface of the moat holder 700 on which the cryo-holder 612 sits is preferably elevated enough so that the work surface 634 is within a cryogenic vapor layer 710, formed above the layer 702 of cryogenic fluid 704 by the slow vaporization of the cryogenic fluid 704 over time. The resulting cryogenic vapor layer 710 would then typically be a combination of cryo-gas from the substantially inert cryo-liquid 704 boiling off plus an additional inert environment within the chamber.

A temperature sensor (not shown) can be suspended above the cryogenic fluid layer 702 at a height substantially equal to the height of the work surface 634 so as to accurately measure an operating temperature at which the specimen would be manipulated within the vapor layer 710. Whereas the temperature of liquid nitrogen (LN2) is most typically around −196° C. or less, it is preferred that the temperature at which the vitreous specimen be manipulated to be between −195° C. and −160° C. Elevation above the top surface 705 of the cryogenic fluid is typically related to temperature. For instance, with LN2, the operating temperature moves closer to the −196° C. temperature of the cryogenic fluid the closer the work surface moves toward the top surface 705—e.g., approximately −161° C. if 17 cm above the cryogenic fluid surface 705, −167° C. if 12 cm above, −168° C. if 7 cm above, etc. But as a microscope is typically used as part of the EXLO system to facilitate manipulation of the microscopic specimen from mount 712 to carrier 714 within the work surface 634 of the specimen holder 612, manipulation is limited to within a very small range of elevation from the cryogenic fluid top surface 705 matching the focal length of the microscope, typically between 18-35 mm above the work surface 634.

The work surface 634 of holder 612 preferably includes a pair of spaced mounting surfaces on which the specimen is manipulated. A specimen, such as specimen 103 formed within bulk substrate 100 (FIG. 1) or a vitreous specimen of a frozen grid of yeast cells, is mounted within specimen mount 712 and manipulated (i.e., moved) to a grid or other specimen carrier 714 via probe 716 using various methods described herein. The specimen may be retained within the specimen mount position 712 using a releasable clip or other means (not shown).

Specimen grid-carrier 714 is retained within a recessed region or via a clip (not shown) having a slitted side portion 715 to allow tweezers/forceps to be inserted within and grasp the grid carrier 714 and mounted specimen for manipulation to an instrument for examination.

Figure 7B:
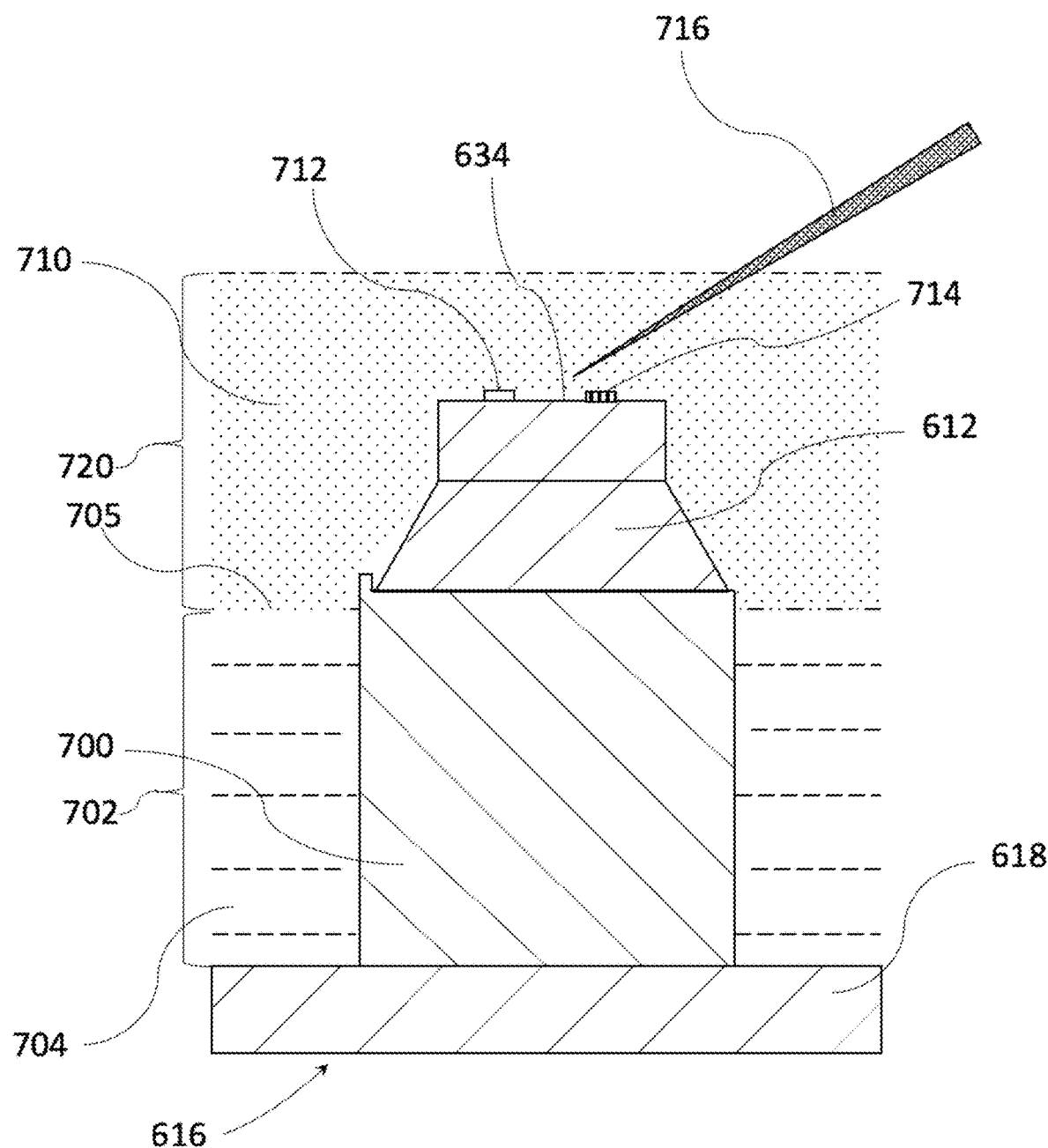

FIG. 7B is a side elevation view of the assembly taken along section lines 7B-7B of FIG. 7A. A layer of liquid cryogen (e.g., LN2) 702 is contained within a cryostat 616. Above the surface 705 of the liquid cryogen (e.g., LN2) layer 702 is a layer 720 of cryogen vapor 710 which is maintained at a low humidity (e.g., <10% relative humidity) and in a substantially inert environment (e.g., nitrogen gas). The cryostat 616 is filled with liquid cryogen 702 to refrigerate the sample holder moat support 700 containing the sample holder 612 such that the liquid cryogen surface 705 is at a level below the work surface 634. Work surface 634 may be customized to accommodate different bulk samples for cryo-FIB milling and predefined positions for one or more specimen grid carriers. An anti-frost cover 628, used to cover the work surface 634 on holder 612 during cryo-transfer steps, is shown in the open position (see FIG. 7A) so that probe 716 with its desired tip shape can be used for the cryo-EXLO manipulation. Note that this geometry where the work surface 634 and the probe manipulation is performed in the vapor phase 720 above the cryogenic liquid surface 705 allows the FIB specimens on the mount surface 712, the grid carrier 714, and the probe 716 to all operate at the same cryogenic temperature.

Figure 8:
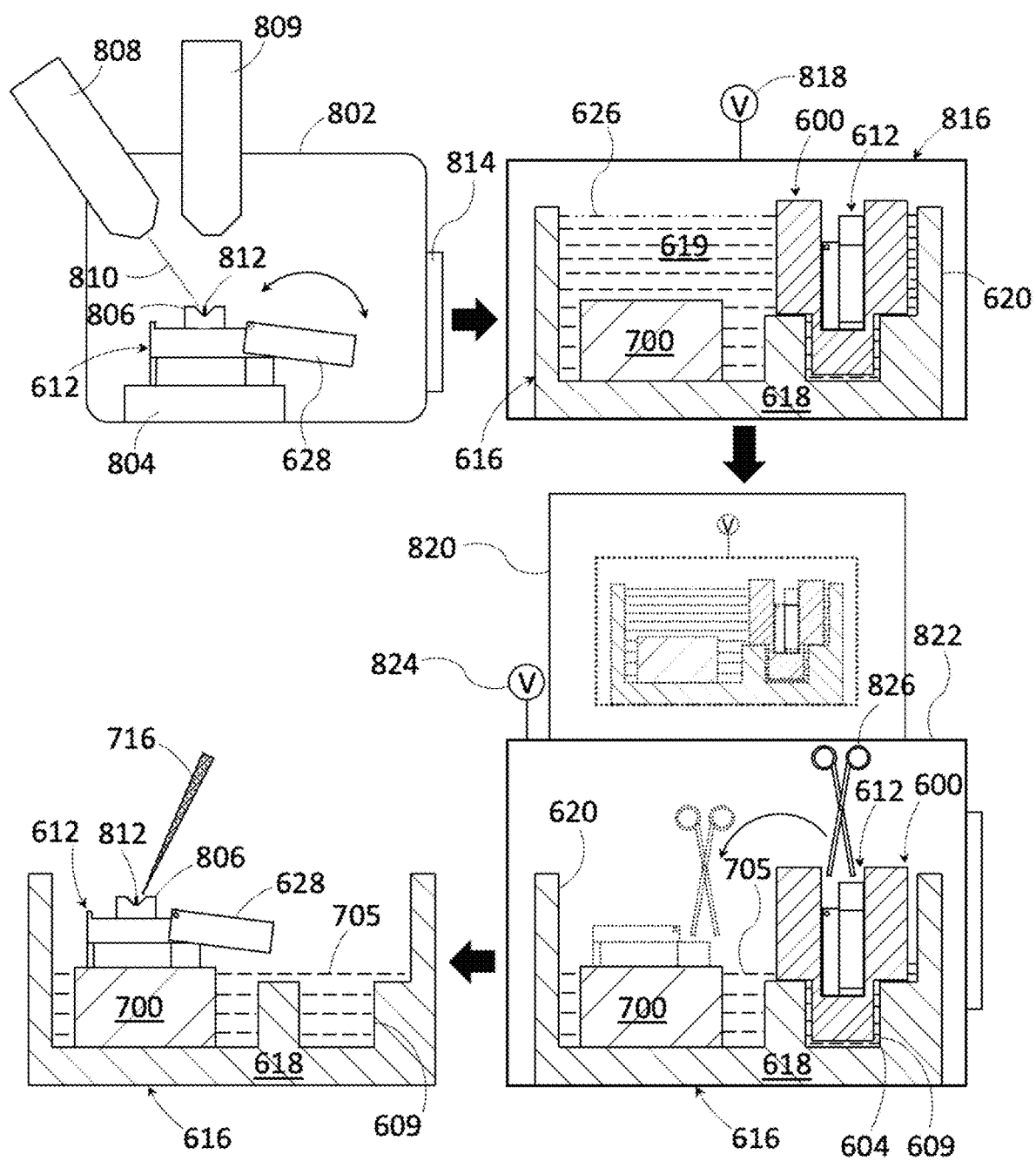
FIG. 8 are schematic side-elevations showing movement of the sample holder through various stages, from formation of the specimen to manipulation of the specimen to a carrier, per teachings of the present invention.
Figure 9:
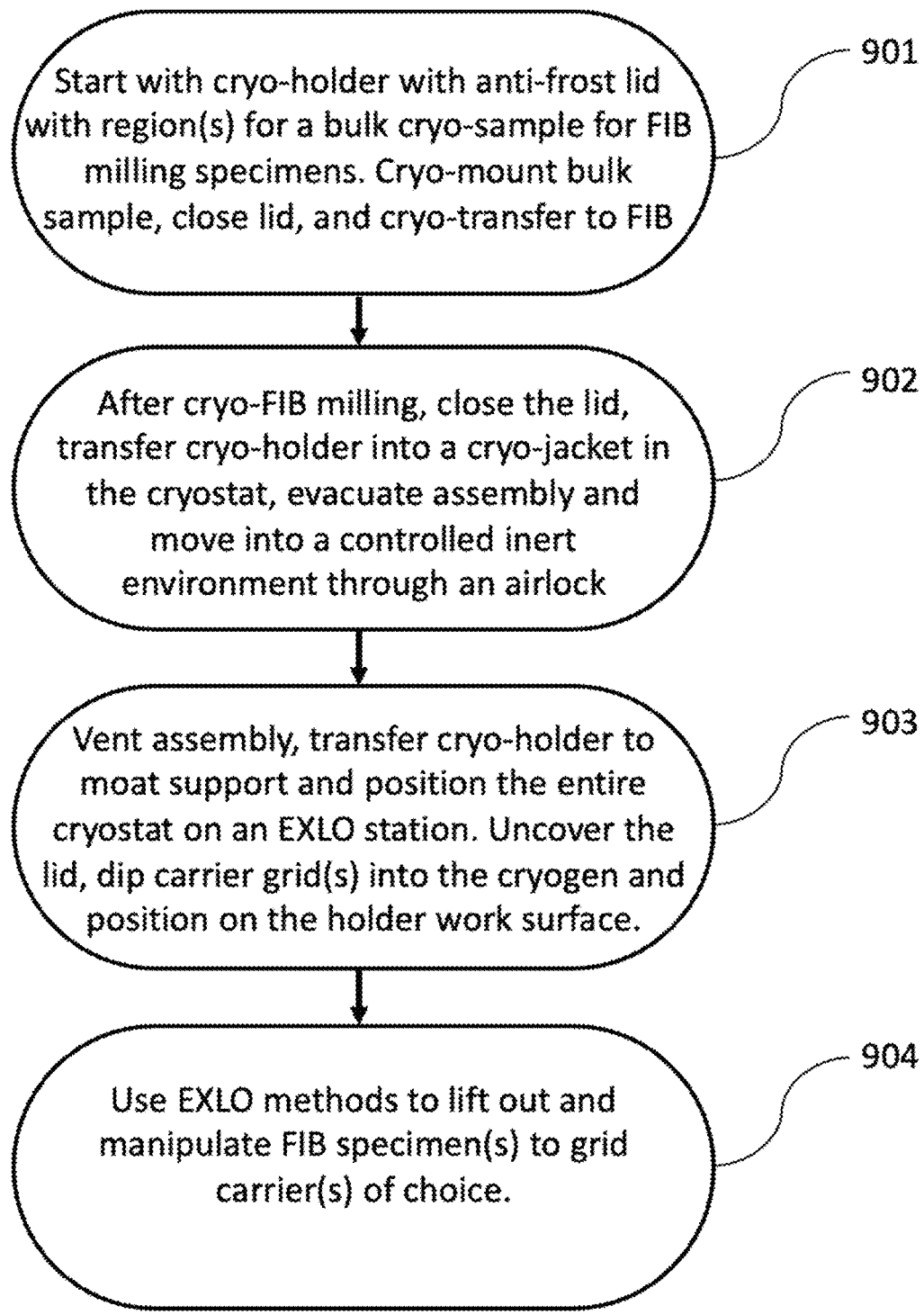
FIG. 9 is a flow diagram of the cryo-EXLO steps implemented according to teachings of the present invention.

FIGS. 8 and 9 show schematic and flow diagram representations, respectively, of the process for moving the specimen from formation through manipulation in a cryogenic environment. In step 901, the specimen holder 612 is mounted within a focused ion beam (FIB) chamber 802 on a cryogenically cooled stage 804 and the anti-frost lid 628 rotated open to expose the bulk sample 806 to the FIB milling instrument 808 which may also contain a scanning electron microscope column 809. When such samples are vitreous or are otherwise of such a nature such that they must be maintained in a cryogenic environment, the bulk sample 806 is cryo-mounted within the FIB and maintained in a cryogenic environment preferably below −140° C. The FIB 808 focuses a beam 810 onto the bulk sample 806 and mills a thin specimen 812 suitable for subsequent examination by an instrument such as an electron microscope. Once the specimen(s) 812 is milled, the anti-frost lid 628 is closed to thus cover the sample and work surface 624 of the specimen holder 612 and to minimize formation of ice contamination. It is understood that FIG. 8 is schematic only and that the illustrated dimensions of the bulk sample 806 and specimen 812 have been increased relative to the size of the holder 612 so that they are viewable in this image. In actuality, the bulk sample and specimen are many times smaller than the specimen holder 612 and would be nearly invisible in a true dimensional representation of FIG. 8. In step 902, and after cryo-milling the specimen 812, the specimen holder 612 and milled specimen 812 are transferred with closed lid 628 through an airlock 814 to a vacuum chamber 816. The specimen holder 612 is positioned so that it rests vertically within the interior cavity 610 (FIG. 6B) of cryo-jacket 600. As described above, the cryo-jacket sits in a bath of cryogenic fluid 614, which itself is retained within a cryostat 616, where the top level 626 of the cryogenic fluid does not extend over the sidewall 620 height of the cryostat 616. The chamber 816 and assembly is evacuated via pump 818 and moved into a controlled inert environment through an airlock 820.

In step 903, the entire cryostat 616 is transferred through airlock 820 and into the glove box chamber 822. The environmental conditions of glove box chamber 822 are then controlled via valve 824 to maintain a relative humidity of <10% and inert gas environment within the chamber 822. Once in the glove box 822, the chamber 816 is vented and the cryostat 616 is removed from chamber 816. Over time, the top level of the cryogenic fluid 614 boils off so that the level reduces from level 626 just below the sidewall height of the cryo-jacket 600, to level 705 just below the top level of the moat support 700. Additional LN2 can also be added as needed inside the glove box 822 to top off the cryogenic fluid level 705 to a desired depth. The venting of the assembly further creates conditions for a cryogenic vapor layer 710 (shown in FIGS. 7A and 7B) that collects just above top fluid surface 705. Grippers, such as forceps 826, are used to grab the closed sample holder 612 from within the cryo-jacket 600 and move the sample holder onto a supporting surface of the moat support 700. The entire cryostat 616 is positioned on an EXLO station so that a user can manually manipulate the FIB specimen, cryostat, and other features of the cryostat through sealed glove hole openings 828 formed through sidewalls of the glovebox 822.

In step 904, the lid 628 is uncovered to thus expose the specimen 812 for manipulation within the cryogenic vapor layer environment. EXLO methods as described above are then used to lift out the specimen 812 from the bulk sample 806 and manipulate to a specimen carrier of choice, such as grid carrier 714 (FIG. 7A) or the slotted grid shown in FIG. 3. Anti-frost cover 628 may be closed and the cryostat 618 can be moved outside glovebox 822 where the grid carrier 714 with specimen 812 can then be transferred to an inspection tool (not shown) for analyzing the cryogenic specimen using various methods such as electron microscopy, Raman spectroscopy, Auger spectroscopy, X-Ray fluorescence spectroscopy, secondary ion mass spectroscopy or other appropriate characterization or analytical technique. All steps within the glovebox 822, including transfer of the cryostat from the airlock 820 into the glovebox 822, venting the glovebox 822, opening the specimen holder lid 628, and manipulating the specimen from specimen mount surface 712 to the holder 714 can be done manually through the sealed glove hole openings 828.

In this way, the described method and associated apparatus enables specimen manipulation that is performed in a cryogenic and environmentally controlled environment, e.g., glove box 822, that is outside of the instrument where the specimen was created, e.g., FIB chamber 802. The described method and apparatus also allows a cryo-holder to be transferred from the instrument where the specimen was created into a cryo-jacket within a cryostat that maintains its cryogenic temperature without submersing the cryo-holder directly into the cryogen. The resulting method and apparatus described thus allows the specimen to be maintained in a vitreous state throughout all transfer and manipulation processes. This has been found to reduce the total time required for specimen manipulation to less than 10 minutes.

It is preferred that the environment in which manipulation of the specimen occurs, e.g., the glove box chamber (PVC/plexi/etc), is kept substantially inert and with a relatively low humidity percentage (i.e., ambient water vapor within the glove box) of preferably <10%. This lowered humidity reduces the chance of ice crystal formation/contamination on the specimen and therefore keeps the FIB-milled specimen surface "clean" for accurate inspection using the inspection tool. A pump and desiccant system, and gas supply 824, can be used to control humidity and inert conditions.

It is understood that the manipulation methods described may be performed with one or more probes either of which may predominantly use Van der Waals forces to lift out specimens with solid surface probes, use vacuum or suction assistance with hollow probes, use probes with gripper or end effectors, or use probes with glue assistance as discussed in the prior art. In addition, one or more specimen carriers may be used in the process for the manipulation of one or more cryo-FIB prepared specimens. Multiple work surfaces may also be positioned in the cryostat such that the work surface is within the cryogenic vapor—as an example, one work surface could include the bulk sample with cryo-FIB specimens, and a second surface could be used for the specimen grid carriers. Some cryo-EMs use conventional grids that are clipped into a larger support structure so they can be handled by automatic grid loaders. For such autoloaders, grids can be pre-clipped into these support structures for the cryo-EXLO process. Alternatively, a work surface could also consist of a specimen grid carrier or pre-clipped specimen grid carrier pre-mounted in an EM holder, reducing an additional cryo-transfer step. In addition, one or more probe types may be used to optimize specimen manipulation. All or part of the EXLO system may be contained within an enclosure providing environmental control. The EXLO system may be accessed through air locks, glove ports, or directly wired or wireless/Bluetooth control of the computerized functions of the system.

FIG. 9 shows a diagram of the basic work-flow of the cryo-EXLO process steps. In step 901, a cryo-holder 612 (FIG. 7A) with an anti-frost lid that can be opened or closed via gravity or by using tweezers or some other tool is used to mount a bulk specimen to its work surface that will be FIB milled to create thin specimens for subsequent cryo-EM. This holder work surface may also be customized to contain a distinct region that will grip, hold, or support a specimen carrier grid. This holder is cryo-transferred into the FIB using conventional methods. An intermediate step within the vacuum load lock prior to positioning on the cryo-FIB stage may include metallic sputter coating with its lid open. Protective FIB deposition and FIB milling is performed using traditional cryo-FIB milling methods combined with the conventional EXLO FIB milling protocol. After FIB milling, step 902 is to close the anti-frost cover and vacuum transfer the cryo-holder into a cryo-jacket positioned inside a cryostat containing a cryogen (e.g., liquid nitrogen, LN2). The cryo-jacket maintains the cryo-holder at cryogenic temperatures during transfer without submerging the holder into the cryogen (e.g., LN2). After the holder is transferred to the cryostat, it is evacuated and the assembly is transferred to a controlled low humidity (<10% relative humidity) and substantially inert environment (e.g., nitrogen gas) through an airlock. During step 903, the assembly is vented, and the holder is cryo-transferred from the cryo-jacket onto a moat support within the cryostat such that the holder working surface is positioned in the cryo-vapor above the cryogen (e.g., LN2) surface, and the entire cryostat is positioned on an EXLO station contained within the humidity controlled and inert environment. The anti-frost lid is uncovered, and a cold specimen grid carrier or a cold pre-clipped specimen grid carrier is positioned on the defined region of the holder work surface. Alternatively, a cryo-EM holder rod with suitable specimen grid carrier may be positioned in the cryostat within the cryogen vapor. Then in step 904, EXLO is performed using any number of the probing techniques described above and in FIG. 10 to manipulate one or more FIB specimens to the specimen grid carrier(s) of choice.

Figure 10:
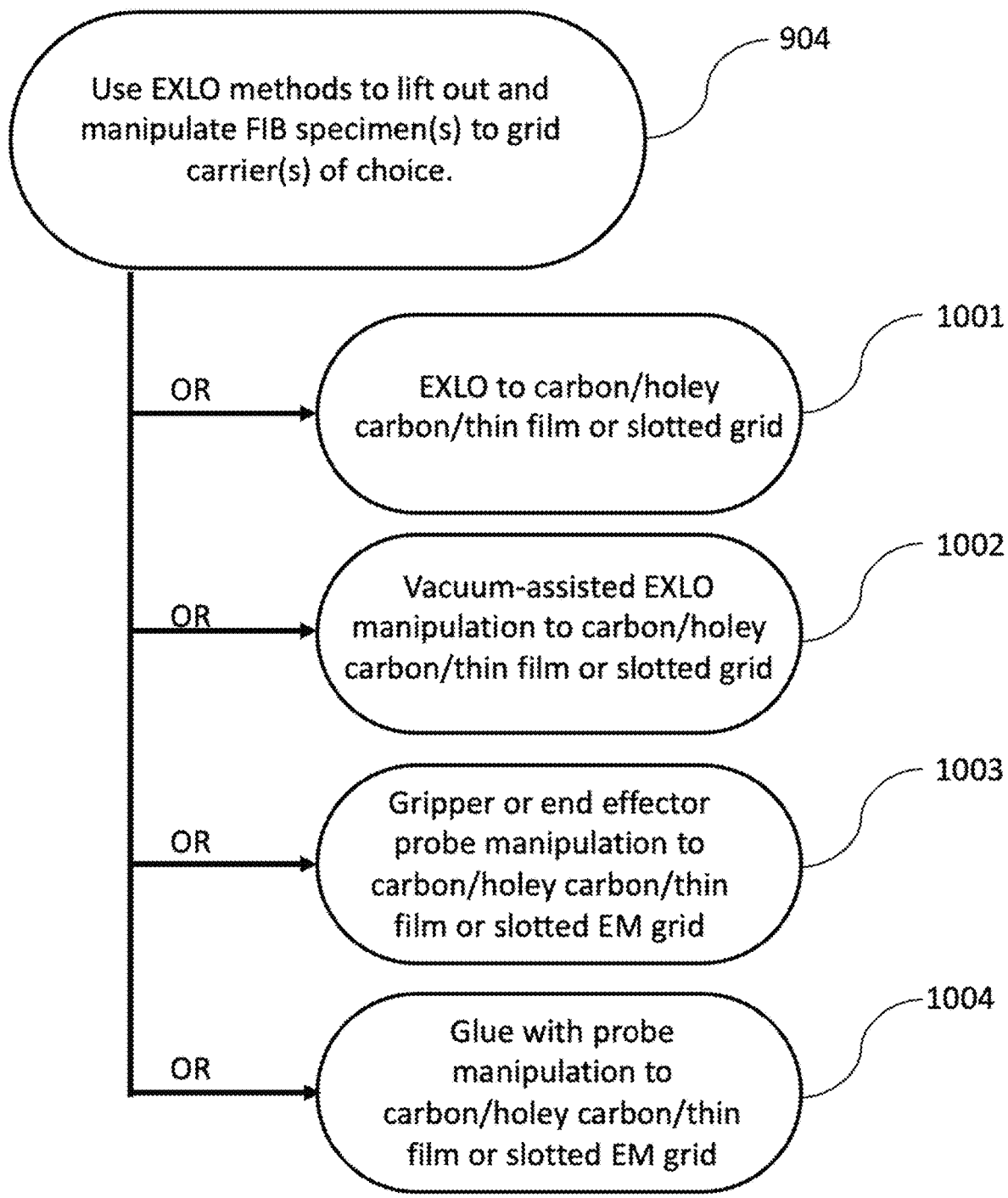
FIG. 10 is a flow diagram listing alternative probing methods steps that can be used along with the cryo-EXLO steps of FIG. 9.

FIG. 10 shows a work-flow diagram indicating alternate choices of probing methods that can be applied with cryo-EXLO 904. It is understood that multiple probes and more than one probe type can be used for the cryo-EXLO manipulation process steps. During step 1001, a conical or beveled probe using predominantly Van der Waals forces can be used to manipulate a cryo-FIB prepared specimen and cryo-transfer it to a grid carrier of choice. During alternate step 1002, a hollow probe using vacuum or suction assistance to manipulate a cryo-FIB prepared specimen can be used to cryo-transfer to a grid carrier of choice. During alternate step 1003, a gripper or probe with end effector can be used to manipulate a cryo-FIB prepared specimen and cryo-transfer it to a grid carrier of choice. During alternate step 1004, a probe with glue can be used to manipulate a cryo-FIB prepared specimen and cryo-transfer it to a grid carrier of choice.

Figure 11:
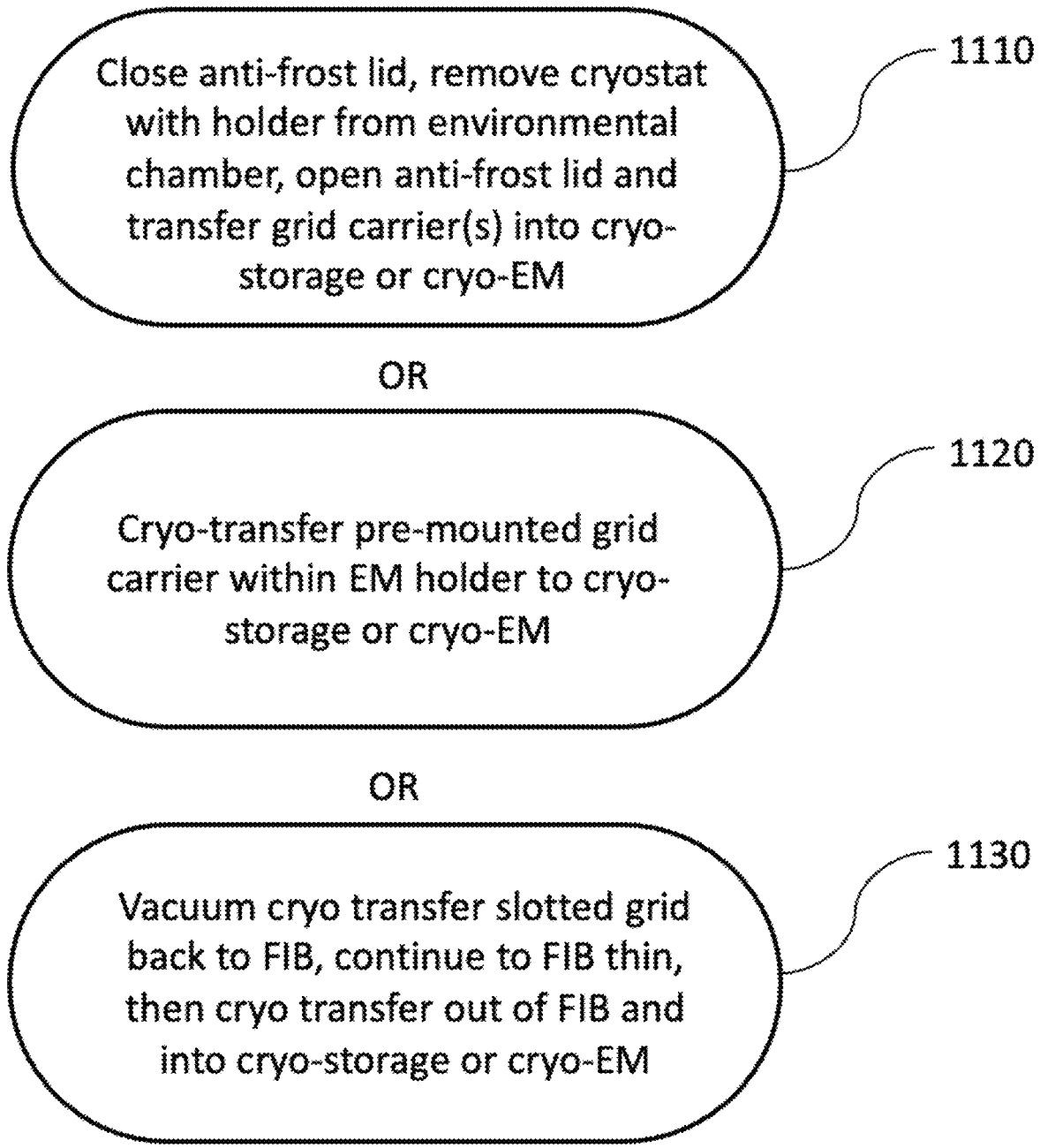
FIG. 11 lists the possible work-flows after manipulation to the carrier grid of choice according to teachings of the present invention.

FIG. 11 shows the steps after manipulation of the specimen to the grid carrier of choice. During step 1110, the anti-frost cover is closed and the cryostat containing the holder is removed from the environmental chamber. The anti-frost lid is opened, and one or more grid carriers are cryo-stored or transferred into the cryo-EM. During step 1120, if a specimen grid carrier is pre-mounted in a cryo-EM holder, then the holder can be cryo-transferred directly into the cryo-EM or the specimen grid carrier can be cryo-stored. During step 1130, if a thick cryo-FIB specimen is manipulated to a slotted grid carrier, the slotted grid carrier can be cryo-transferred back into the cryo-FIB for additional FIB thinning prior to cryo-transferring to cryo-storage or the cryo-EM.

Figure 12A:
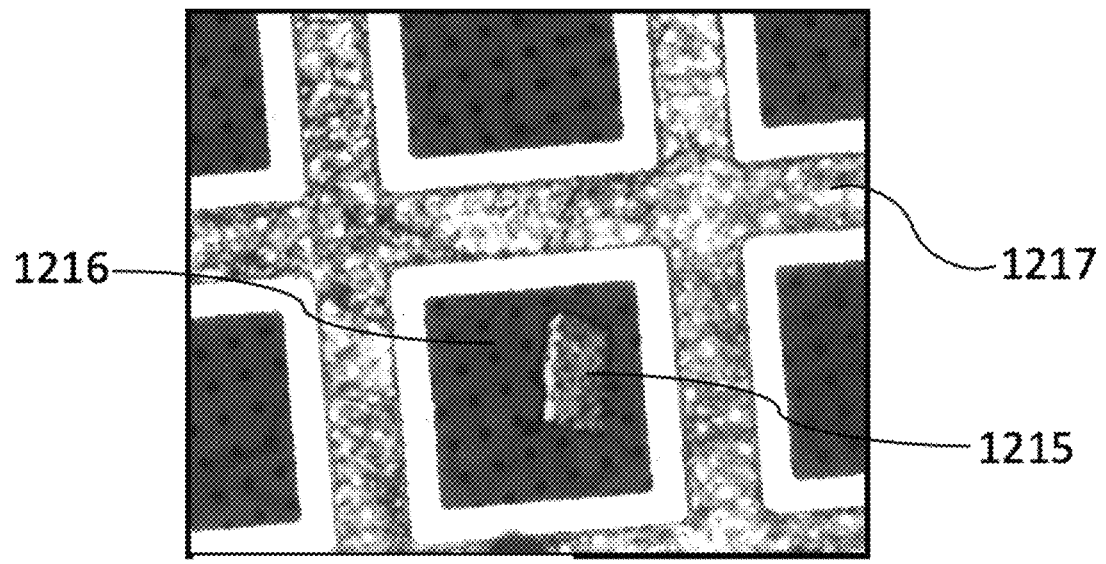
FIG. 12A is a light optical microscope image of the cryo-specimen on a specimen grid carrier.

FIG. 12A is a light optical microscope image obtained with the EXLO station immediately after cryo-EXLO manipulation and shows the vitreous yeast specimen 915 manipulated to the carbon film membrane 916 supported by the copper grid frame 917.

Figure 12B:
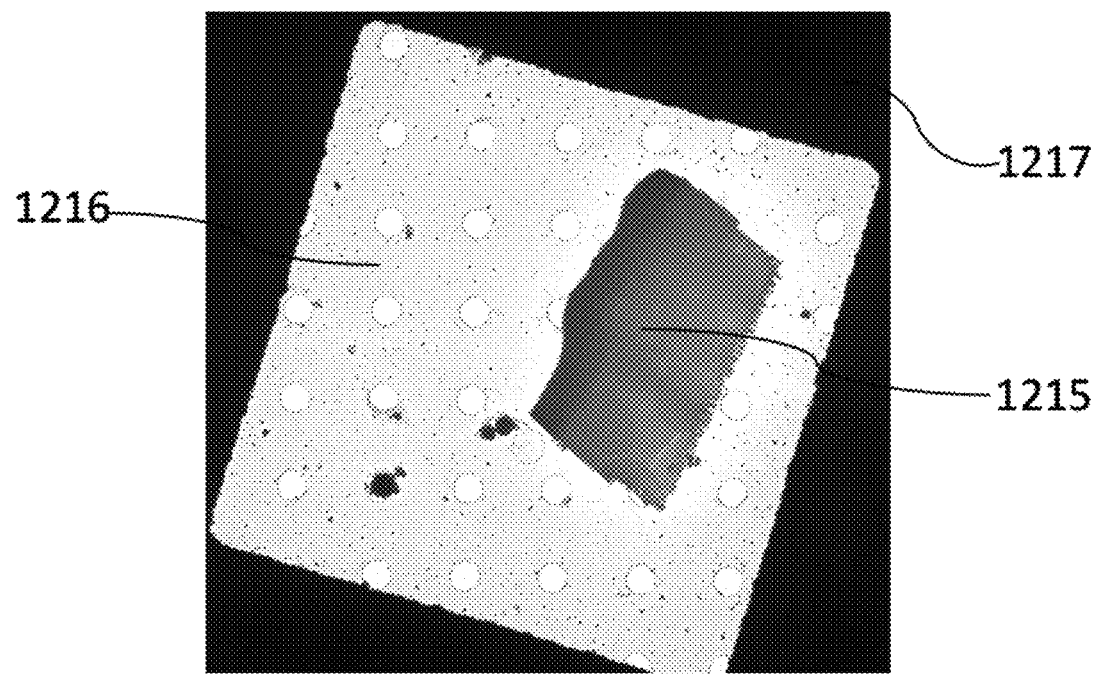
FIG. 12B is a cryo-EM image of the cryo-specimen on the specimen grid carrier.

FIG. 12B is a bright field energy filtered cryo-EM image of the vitreous yeast specimen 915, carbon film 916 and copper grid 917.

Having described and illustrated the principles of the invention in a preferred embodiment thereof, it should be apparent that the invention can be modified in arrangement and detail without departing from such principles. Other materials and processes may be used, and the specimens may be formed of beam-sensitive materials that need to remain cold during formation, manipulation, and inspection, but not necessarily at a temperature of less than −140° C. I thus claim all modifications and variation that may arise within the spirit and scope of the following claims.

What is claimed is:
1. A method for manipulating a cryogenic specimen for subsequent examination comprising:
   mounting a cryogenic specimen on a work surface of a specimen holder;
   placing the specimen holder within a cryostat chamber having a layer of cryogenic liquid with a cryogenic vapor layer above the cryogenic liquid so that the work surface of the specimen holder is within the cryogenic vapor layer; and
   manipulating the cryogenic specimen to a specimen carrier contained on a different portion of the work surface while keeping the cryogenic specimen within the cryogenic vapor layer.

2. The method of claim 1, wherein the step of manipulating the cryogenic specimen ex situ includes at least one of adhering the cryogenic specimen to a solid surface probe tip using predominantly Van der Waals forces, adhering the cryogenic specimen to a hollow surface probe tip using vacuum or suction assistance, adhering the cryogenic specimen to a probe tip with a gripper or end effector, and adhering the cryogenic specimen to a tip of a probe using glue assistance.

3. The method of claim 1, wherein the cryogenic vapor layer is substantially inert.

4. The method of claim 3, wherein the cryogenic liquid is liquid nitrogen (LN2), liquid helium, liquid ethane, or liquid argon.

5. The method of claim 1, further including the step of maintaining an environment in which the manipulation step occurs at a relative humidity of <10%.

6. The method of claim 1, further including the steps of:
   placing a moat support structure within the cryogenic liquid; and
   mounting the specimen holder on the moat support structure such that the work surface of the specimen holder is elevated into the cryogenic vapor layer.

7. The method of claim 6, wherein the moat support structure includes a top surface elevated above a top surface of the cryogenic liquid, the step of mounting the specimen holder on the moat support including supporting the specimen holder on the top surface of the moat support.

8. The method of claim 1, wherein the step of manipulating the cryogenic specimen to a different portion of the work surface includes moving the cryogenic specimen to a specimen grid carrier.

9. The method of claim 8, wherein the specimen grid carrier is positioned on the different portion of the work surface.

10. The method of claim 9, and after the manipulating step, further including the step of analyzing the cryogenic specimen using electron microscopy, Raman spectroscopy, Auger spectroscopy, X-Ray fluorescence spectroscopy, secondary ion mass spectroscopy or other appropriate characterization or analytical technique.

11. The method of claim 1, further including the steps of:
   mounting a bulk sample on the specimen holder;
   moving the specimen holder with the cryogenic specimen from the instrument into a cryo-jacket; and
   maintaining the specimen holder and cryo-jacket under vacuum.

12. The method of claim 11, further including the steps of:
   covering the working surface of the specimen holder with an anti-frost lid after the step of creating the cryogenic specimen with the instrument and before the step of moving the specimen holder into the cryo-jacket.

13. The method of claim 12, further including the steps of:
   venting the cryostat chamber such that the cryostat chamber is maintained at a relatively low humidity in a primarily inert environment; and transferring the specimen holder from the cryo jacket onto a moat support structure within the cryostat chamber.

14. The method of claim 13, further including the step of creating the cryogenic specimen from the bulk sample in an instrument at a temperature below (−140° C.).

15. The method of claim 13, wherein the specimen is a biological specimen, the method further including the step of maintaining the specimen in a vitreous condition throughout transfer and manipulation steps.

16. An apparatus for manipulating a cryogenic specimen, comprising:
a cryostat chamber having a layer of cryogenic liquid and cryogenic vapor layer above the cryogenic liquid;
a cryogenic specimen holder positioned within the cryostat chamber and configured to maintain a cryogenic specimen on a work surface located only within the cryogenic vapor layer consisting of low relative humidity (<10%) and under substantially inert conditions.

17. The apparatus of claim 16, further including a specimen grid carrier mounted on the work surface of the cryogenic specimen holder, said carrier being configured to receive the cryogenic specimen for subsequent analysis using methods selected from the group consisting of electron microscopy, Raman spectroscopy, Auger spectroscopy, X-Ray fluorescence spectroscopy, secondary ion mass spectroscopy or other appropriate characterization or other analytical technique.

18. The apparatus of claim 16, further including a moat support structure positioned within the cryogenic liquid, wherein the specimen holder is positioned on the moat support such that the specimen holder work surface makes no contact with the cryogenic liquid and the work surface of the specimen holder is elevated into the cryogenic vapor layer.

19. The apparatus of claim 18, wherein the moat support structure includes a top surface elevated above a lower surface of the cryogenic liquid, such that the specimen holder is positioned on the top surface of the moat support.

20. The apparatus of claim 16, further including:
a cryo-jacket positioned within the cryogenic liquid of the cryostat and having its bottom and side walls in contact with but elevated above a top surface of the cryogenic liquid so as to form an interior compartment configured to receive the cryogenic specimen holder within such that the holder makes no contact with the cryogenic liquid.

21. The apparatus of claim 16, wherein the cryogenic specimen holder includes an anti-frost lid configured to move between an open position exposing the work surface and a closed position covering the working surface.

22. The apparatus of claim 16, wherein the cryogenic liquid is one taken from the group consisting of liquid nitrogen (LN2), liquid helium, liquid ethane, and liquid argon.

* * * * *

UNITED STATES PATENT AND TRADEMARK OFFICE
CERTIFICATE OF CORRECTION

| | | |
|---|---|---|
| PATENT NO. | : 11,808,679 B2 | Page 1 of 1 |
| APPLICATION NO. | : 17/586565 | |
| DATED | : November 7, 2023 | |
| INVENTOR(S) | : Lucille A. Giannuzzi | |

It is certified that error appears in the above-identified patent and that said Letters Patent is hereby corrected as shown below:

In the Specification

Column 1 Line 4 Please insert the following statement as a first paragraph after the title of the invention:
--This invention was made with Government support under DE-SC0020511 awarded by the United States Department of Energy (DOE). The Government has certain rights in this invention.--

Signed and Sealed this
Twenty-sixth Day of November, 2024

Katherine Kelly Vidal
*Director of the United States Patent and Trademark Office*